(12) United States Patent
Blackman et al.

(10) Patent No.: US 11,762,671 B2
(45) Date of Patent: Sep. 19, 2023

(54) VIRTUALIZATION-BASED COLLABORATIVE ACTIVITY FRAMEWORK WITH PREDICTIVE PRELOADING OF VIRTUAL MACHINES

(71) Applicant: Smashcut, Inc., Montclair, NJ (US)

(72) Inventors: Daniel Blackman, Montclair, NJ (US); Evan Eustace, Philadelphia, PA (US); William L Disney, Warren, NJ (US)

(73) Assignee: Smashcut, Inc., Montclair, NJ (US)

( * ) Notice: Subject to any disclaimer, the term of this patent is extended or adjusted under 35 U.S.C. 154(b) by 0 days.

(21) Appl. No.: 17/982,370

(22) Filed: Nov. 7, 2022

(65) Prior Publication Data
US 2023/0141692 A1     May 11, 2023

Related U.S. Application Data

(60) Provisional application No. 63/277,029, filed on Nov. 8, 2021.

(51) Int. Cl.
*G06F 9/445*     (2018.01)
*G06F 9/455*     (2018.01)

(52) U.S. Cl.
CPC ........ *G06F 9/4451* (2013.01); *G06F 9/45558* (2013.01); *G06F 2009/45562* (2013.01); *G06F 2009/45595* (2013.01)

(58) Field of Classification Search
None
See application file for complete search history.

(56) References Cited

U.S. PATENT DOCUMENTS

| | | | |
|---|---|---|---|
| 6,941,105 B1 * | 9/2005 | Rowley | G09B 7/02 434/350 |
| 8,572,370 B1 | 10/2013 | Tormasov | |
| 8,762,708 B2 * | 6/2014 | Blankenbeckler | H04L 63/0464 713/155 |
| 2009/0282101 A1 | 11/2009 | Lim et al. | |
| 2009/0328030 A1 | 12/2009 | Fries | |

(Continued)

OTHER PUBLICATIONS

International Search Report and Written Opinion in International Appln. No. PCT/US2022/049147, dated Feb. 28, 2023, 22 pages.

*Primary Examiner* — Wynuel S Aquino
(74) *Attorney, Agent, or Firm* — Fish & Richardson P.C.

(57) ABSTRACT

Methods, systems, and apparatus, including medium-encoded computer program products, for virtualization-based collaborative activity framework with predictive preloading of virtual machines. A collaboration orchestration system can obtain user interaction data describing interactions with a client device. In response to determining, at least in part from the user interaction data, that the client device is predicted to access an activity, and before receiving a request to access the activity, the collaboration orchestration system can: (i) provide an indication to create a virtual machine (VM) instance configured to provide the activity; and (ii) provide an indication to load the VM instance with the activity. The collaboration orchestration system can receive a reference to the VM instance. In response to obtaining, by the collaboration orchestration system, a request to access the activity from the client device, the collaboration orchestration system can provide to the client device, the reference to the VM instance.

19 Claims, 8 Drawing Sheets

(56) References Cited

U.S. PATENT DOCUMENTS

| | | | |
|---|---|---|---|
| 2012/0089833 A1* | 4/2012 | Jirka | H04L 63/0823 |
| | | | 713/168 |
| 2013/0024855 A1* | 1/2013 | North | G06F 11/2097 |
| | | | 718/1 |
| 2014/0208316 A1* | 7/2014 | Ciano | G06F 9/4856 |
| | | | 718/1 |
| 2015/0293773 A1* | 10/2015 | Cai | G06F 9/45558 |
| | | | 718/1 |
| 2015/0347194 A1* | 12/2015 | Che | G06F 9/45558 |
| | | | 718/1 |
| 2016/0132197 A1* | 5/2016 | Bocz | G16H 40/63 |
| | | | 715/708 |
| 2017/0078411 A1 | 3/2017 | Hayden | |
| 2017/0083354 A1 | 3/2017 | Thomas et al. | |
| 2017/0147372 A1* | 5/2017 | Cudak | G06F 9/45558 |
| 2019/0007518 A1* | 1/2019 | Mcelhoe | G06F 8/60 |
| 2019/0311440 A1* | 10/2019 | Bishop | G06Q 30/0611 |
| 2020/0193543 A1 | 6/2020 | Lippert et al. | |
| 2021/0236924 A1 | 8/2021 | Chaput et al. | |
| 2021/0271500 A1* | 9/2021 | Elliott | G06F 9/30101 |
| 2021/0373978 A1* | 12/2021 | Fong | G06F 9/4843 |

* cited by examiner

VIRTUALIZATION-BASED COLLABORATIVE ACTIVITY FRAMEWORK WITH PREDICTIVE PRELOADING OF VIRTUAL MACHINES

CROSS-REFERENCE TO RELATED APPLICATION

This application claims the benefit of U.S. Provisional Pat. App. No. 63/277,029, filed Nov. 8, 2021, which is incorporated by reference.

FIELD

This specification relates to a virtualization-based collaborative activity framework that predictively preloads virtual machines.

BACKGROUND

Virtualization provides an emulation of physical computing resources, such as central processing units (CPUs), storage and networking, or a combination of computing resources. Collaborative activities can include cooperative development and/or cooperative viewing of media content, including multimedia content.

SUMMARY

This specification describes technologies relating to virtualization-based collaborative activity framework with predictive preloading. By generating and using predictions related to content access patterns, the framework enables users to interact efficiently with collaborative content that can include gigabytes of data or more. The framework further supports rich collaboration among consumers of the content, enabling users to dynamically hand off control of the content to other users.

Particular embodiments of the subject matter described in this specification can be implemented so as to realize one or more of the following advantages. The techniques described below can be used to predictively preload collaborative content into a virtual machine, reducing the latency perceived by a user. Since collaborative content can include gigabytes of data, and loading virtual machine images of that size can create unacceptably long delays for a user, preloading the image greatly improves the user experience. However, preloading all possible content into virtual machines would result in an inefficient use of computing resources, and the predictive preloading techniques of this specification balance the efficient use of computing resources with limiting delays experienced by users. Further, all users can access and interact with the content, even on resource-constrained devices that have the ability to render user interfaces, but lack the capacity to execute the large collaborative content images. In addition, to ensure that resources are fairly allocated among users of the framework, the techniques include suspending or terminating collaboration sessions that exceed resource use limits. Further, to ensure that security is preserved, the techniques include providing secure access to the collaborative sessions. Additionally included are techniques for monitoring progress of users as they progress through content. Such monitoring can benefit users as they can be provided assistance if sufficient progress is not made and when they request help. Relatedly, the techniques include allowing users to provide requests for collaboration with other users who can simultaneously access identical renderings of the content, and the ability to securely transfer control of the content among collaborating users.

One aspect features a collaboration orchestration system that can obtain user interaction data that describe interactions with a first client device. In response to determining, by the collaboration orchestration system and at least in part from the user interaction data, that the first client device is predicted to access a particular activity, and before receiving a request to access the particular activity, the collaboration orchestration system can: (i) provide an indication to create a virtual machine instance configured to provide the particular activity; and (ii) provide an indication to load the virtual machine instance with the particular activity. The collaboration orchestration system can receive a reference to the virtual machine instance. In response to obtaining, by the collaboration orchestration system, a request to access the particular activity from the first client device, the collaboration orchestration system can provide to the first client device, the reference to the virtual machine instance.

One or more of the following features can be included. The collaboration orchestration system can obtain a progress indicator that specifies progress of the first client device through the particular activity, in response determining that the progress indicator satisfies criteria, the collaboration orchestration system can provide a progress notification. Determining that the first client device is predicted to access the particular activity can include processing, by the collaboration orchestration system, an input that includes the user interaction data using a model that is configured to predict access to one of a plurality of activities. The collaboration orchestration system can obtain from the first client device, a first request for assistance. The collaboration orchestration system can obtain from a second client device that is not the first client device, an affirmative indication of assistance. The collaboration orchestration system can provide to the second client device, access to the particular activity.

A second aspect features an activity system that, in response to a determination that a first client device is predicted to access a particular activity, and before a request the particular activity is received, can create a virtual machine instance configured to provide the particular activity. The activity system can load a virtual machine image configured for the particular activity to the virtual machine instance. In response to obtaining, by the activity system, an indication to load the virtual machine instance with the particular activity, the activity system can provide a reference to the virtual machine instance.

One or more of the following features can be included. The virtual machine image can include an agent. The activity system can provide an input channel to a second client device. In response to determining, by the activity system, that an inactivity threshold for the particular activity has been satisfied, the activity system can: (i) store state information relating to the particular activity, and (ii) terminate the virtual machine instance. In response to determining, by the activity system, that resource usage of the virtual machine instance satisfies a threshold, behavior of the virtual machine image can be altered. The altering can be at least one of suspending the virtual machine instance or terminating the virtual machine instance. Providing the reference to the virtual machine instance further can include the activity system creating a security key and providing the security key to the first client device. The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements

DETAILED DESCRIPTION

Figure 1A:
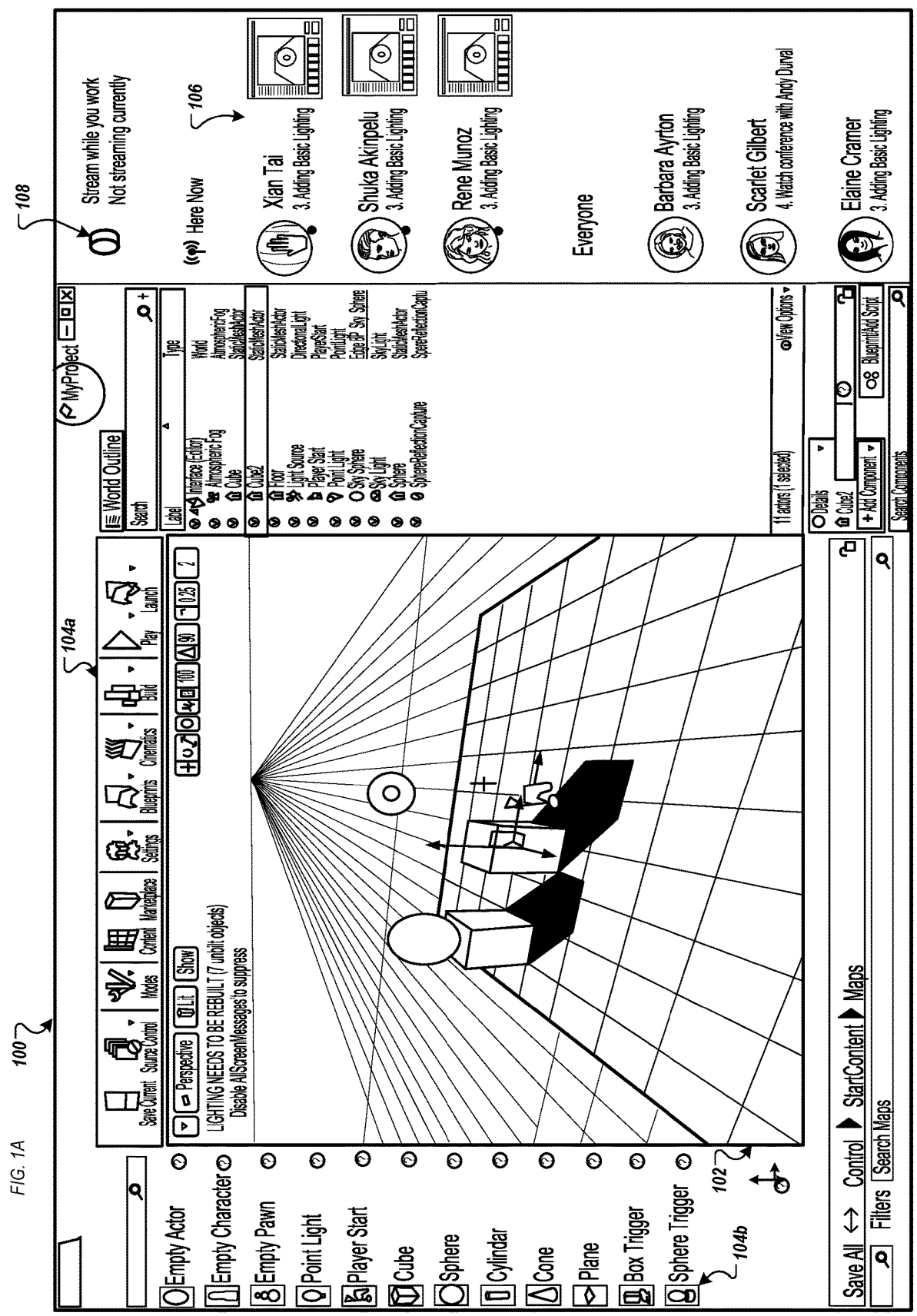
FIG. 1A shows an example interface for a virtualization-based collaborative activity framework.

FIG. 1A shows an example of an interface 100 for a virtualization-based collaborative activity framework. Collaborative activities are increasingly important as a growing number of modern jobs require training in the use of advanced software applications for the creation of digital artifacts, such as films, games, 3D visualizations and animation. Further, remote and global collaboration is becoming central to professional work using these applications. However, traditional models of software training using physical computer labs and on-site instructors are difficult to scale and do not align well with the distributed nature of modern work.

Many professionally-used applications, e.g., those used for game design, animation, film editing and fashion design, are large and complex, requiring the installation and operation of large, resource-intensive digital assets. Using such applications can require powerful computing resources, such as fast Central Processing Units (CPUs), Graphics Processing Units (GPUs), and storage. Potential users of such applications often do not have access to such computing resources. In addition, delays and distractions associated with loading large assets and configuring computing resources are detrimental to learning. Long delays in downloading multimedia or in uploading work, or difficulties with complex machine and software configuration, can interrupt learning flow and divert users' attention from learning activities.

In contrast, the efficient use of computing resources and support for collaboration among users encourage effective learning. The techniques described in this specification enable students to connect easily with instructors or peers to share, discuss or troubleshoot work, which fosters learning and development of workspace-ready collaboration skills.

In addition, the techniques result in the efficient use of computing resources, and reduce delays when loading large files, including multimedia files. For example, the techniques described in this specification can monitor progress of a participant through the activities in a curriculum, and based on the progress, predict future actions of the participant. Based on the prediction, the system can perform actions such as preloading a virtual machine, and preloading content to the virtual machine, reducing latency experienced by participants.

Returning to FIG. 1A, the interface 100 can include various panels and controls that enable users to perform activities that are part of a curriculum. The main panel 102 shows the environment for developing a complex multimedia environment. Rendering and storing such complex multimedia environments requires substantial resources, which can exceed the capacity of many user devices. The interface 100 can also include controls 104a, 104b that enable users to perform the activity. Examples of controls 104a, 104b can include adding elements such as actors, characters, cubes, etc., and performing actions such as saving, building, and playing. The interface 100 can further include collaborative elements 106. In this example, the collaborative elements 106 in the interface 100 indicates which users are on-line and their progress through the activity. The interface 100 can further allow users to determine whether they would like to stream their work, for example, by including a toggle widget 108 that enables that indicates their streaming status.

Figure 1B:
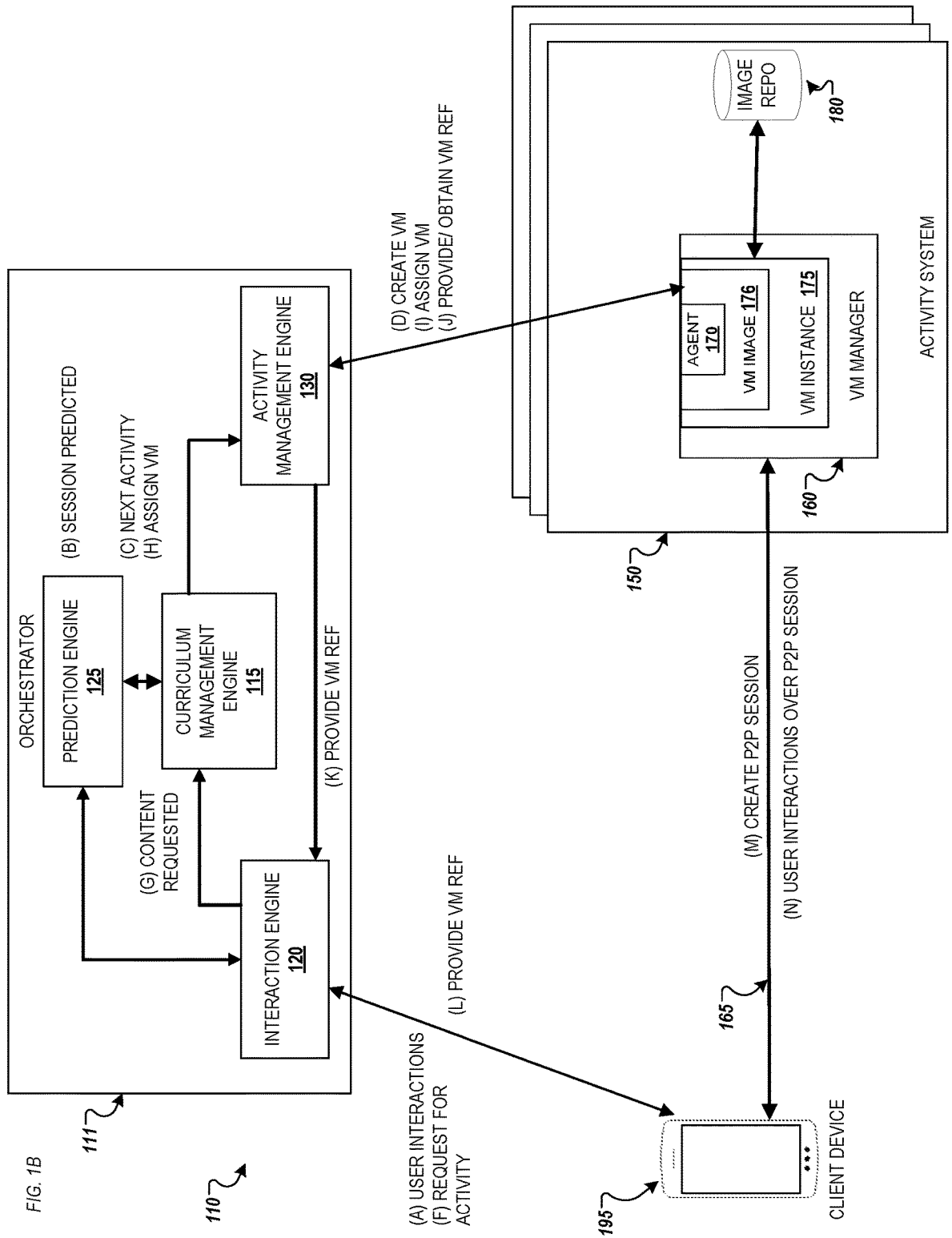
FIGS. 1B, 2-4 show examples of environments for a virtualization-based collaborative activity framework.

FIG. 1B shows an example of an environment for a virtualization-based collaborative activity framework. The environment 110 can include a collaboration orchestration system 111 ("orchestrator," for brevity), one or more activity systems 150 and client devices 195.

A client device 195 is an electronic device that is capable of requesting and receiving resources over a network such as the Internet or an intranet. Example client devices 195 include personal computers (e.g., laptop and desktop computers), mobile communication devices (e.g., cellular telephones and tablet computers), and other devices that can send and receive data over the network. A client device 195 typically includes user applications, such as a web browser, to display information, permit user interactions (e.g., taps, swipes, typing, etc.), and facilitate the sending and receiving of data over the network. Native applications executed by the client device 195 can also facilitate such functions. Client devices 195 can include hardware and/or software that enable voice interaction with the client devices 195. For example, the client device 195 can include a microphone through which users can submit audio (e.g., voice) input, such as commands, search queries, browsing instructions, smart home instructions, and/or other information. Additionally, the client devices 195 can include speakers through which users can be provided audio (e.g., music, voice, etc.) output.

The orchestrator 111 manages interactions between a user on a client device 195 and the activities indicated by a curriculum. In response to interactions with the client devices, the orchestrator 111 can launch activities on an activity system 150. The orchestrator 111 can include a curriculum management engine 115, an interaction engine 120, a prediction engine 125 and a virtual machine (VM) orchestrator 130.

The curriculum management engine 115 ("curriculum manager," for brevity) accepts user input data obtained from client devices 195 by the interaction engine 120, and manages the user's progression through activities in a curricula. The curriculum manager 115 can provide curricula to the prediction engine 125, receive from the prediction engine 125 prediction regarding users' progression through activities in a curriculum, and direct the activity management engine 130 to launch activities on an activity system 150.

A curriculum can refer to an ordered series of activities that can include branches, including conditional branches. Each activity can include various elements, such as assignments, viewing activities, interactive activities, and other learning elements. A viewing activity can include information being presented to the participant, and the information can be audio, images, video, text or any combination thereof. An assignment can include one or more prompts to which the participant can provide responses, which can be in the form of audio (including spoken audio), video, images, text or any combination thereof. An interactive activity can include multiple elements, such as a viewing activity and an assignment in which information is presented and the participant provides responses.

The activities in a curriculum can be presented in an order defined by the curriculum, which can be considered a workflow. In some cases, the activities can be arranged linearly within a workflow, with all participants following a given order, such as Activity A, then Activity B, then Activity C, and so on. In some cases, activities can be arranged with a choice of order. For example, a curriculum might be structured as Activity A; then Activities B and C in either order; then Activity D. In some cases, a curriculum can include branches. For example, depending on the results of Activity A, the participant is directed to either Activity B or Activity C. Curricula can include multiple instances of such activity arrangements of any length.

Curricula and/or activities can be associated with one or more topics relevant to the activity or curriculum. For example, a topic can be an identifying string, such as "shading," "motion," "algebra," "Spanish," or any other appropriate topic identifier.

The interaction engine 120 can accept user interaction data from client devices 195 and the activity system 150. User interaction data can describe clicks, taps, swipes, keyboard input, pen input and other interactions that users perform with client devices 195. User interaction data can further describe interactions with one or more activities in a curriculum. Such user interaction data can include the type of interaction (e.g., begin, pause, restart, select, view, close, request assistance, etc.), the content with which the interaction occurs, the time of the interaction, and the duration of the interaction, the order in which interactions occurred with activities, among other examples. User interaction data can also include interaction path data that describes sequences of interactions between a client device 195 and activities in a curriculum, in multiple curricula, or other content. The interaction engine 120 can provide the user interaction data to the prediction engine 125.

The prediction engine 125 can accept user interaction data and curricula and use such data to create predictions. Predictions can indicate that a client device is predicted to request a particular activity within a curriculum. The prediction engine 125 can include one or more models configured to generate predictions, and the models can include machine learning models. The prediction engine 125 can provide the predictions to the interaction engine and/or the activity management engine 130.

The activity management engine 130 can provide instructions to activity systems 150 that enables the activity systems 150 to operate efficiently. For example, the activity management engine 130 can instruct the activity system 150 to create a VM instance 175 into which images 176 can be loaded. Since images 176, including images 176 that include activities, can be large, and therefore can require many seconds or minutes to load, by preloading VM instances 175 with images 176, the activity system 150 can respond more quickly to requests from client devices 195 to access information in the image. The activity management engine 130 can receive session predictions from the curriculum management engine 115 and use the predictions when providing instructions to the activity system 150.

The activity system 150, which can include a VM manager 160 and an image repository 180, can provide activities to a user. As described above, activities can produce user interface presentation data that is rendered on client devices 195, and can include audio, video, images, and multimedia. Activities can further include user interface elements such as buttons and text fields that can allow client devices 195 to provide input to the activity, and the activity system 150 can adapt the execution of the activity according to user interaction data received from the client devices 195. For example, the activity might include a navigation widget that allows a user on a client device 165 to select an order of presentation of elements within an activity.

The VM manager 160 can perform various operations relating to VM instances 175 including creating a VM instance 175, loading an image 176 in the VM instance 175, saving a VM instance 175, including saving the state of the VM instance 175, destroying a VM instance 175, among other operations. In some implementations, the VM manager 160 can be a hypervisor.

The image repository 180 can be any suitable repository, or combinations of repositories, including relational databases, object databases, file systems, block storage, etc. The image repository 180 can be configured to accept activity identifiers, and to provide the VM images 176 associated with the activity identifiers. The VM manager 160 can interact with the image repository 180 using operations suitable for the repository type. For example, the VM manager 160 can interact with an image repository 180 that includes a relational database using Structured Query Language (SQL) operations, and the VM manager 160 can interact with an image repository 180 that includes a file system using file system operations.

VM instances 175 can be used to execute VM images 176. A VM image 176 can contain an operating environment, an agent 170 and one or more activities. The agent 170 can perform management activities for the VM instance 175. For example, the agent 170 can monitor client device 195 interactions with the VM instance 175 and provide information about the interaction to the orchestrator 111. In another example, when a client device 195 is closing a session with a VM instance 175, the agent 170 can store the image state, which can include progress through the activities in a curriculum, in the image repository 180. In some implementations, the agent 170 can run as part of the VM manager 160, performing management activities for multiple VM instances 175. The operating environment can include software components necessary for executing applications, including activities in a curriculum, on a virtual machine. Examples of such software components can include one or more host operating systems, databases, messaging systems, web servers, transaction management systems, and so on.

The example of FIG. 1B illustrates how the orchestrator 111 and the activity system 150 can efficiently provide client devices 195 with access to activities that are included in a curricula. In stage (A), the interaction engine 120 in the orchestrator 111 can accept user interaction data from a client device 195. Based at least in part on the user interaction data, the prediction engine 125 can determine whether the client device 195 is predicted to interact with activities in a particular curriculum, and this determination can be made prior to receiving a request for the activities curriculum. For example, the prediction engine 125 can include one or more models configured to predict interactions with activities.

In stage (B), when such an interaction is predicted, the prediction engine 125 can provide the prediction to the curriculum management engine 115, allowing the curriculum management engine 115 to determine which is most likely to be requested. For example, the next activity can be an incomplete activity or the activity that is sequentially next in the curriculum. Having determined the next activity in the curriculum, in stage (C), the curriculum management engine 115 can provide an indication of the activity to the activity management engine 130.

In response, the activity management engine 130 can cause the creation (stage D) of a virtual machine instance 175 configured to provide the particular activity or activities. The activity management engine 130 can provide an instruction to the VM manager 160 indicating both that the VM manager 160 should create a VM instance 175 and that the VM instance should load image 176 containing the particular activity. The activity management engine 130 can provide various types of data, including the instruction, using any appropriate technique, such as invoking an Application Programming Interface (API) provided by the VM manager 160 that is configured to accept instructions or providing a message over TCP/IP or HTTP.

In stage (E), the VM manager 160 can retrieve and preload from the image repository 180 an image 176 that contains the activity to be loaded in the VM instance 175. In some implementations, the VM manager 160 first creates a VM instance 175, then loads the VM image 176 to the VM instance 175. In some implementations, the VM manager 160 creates a VM instance 175 by loading a VM image 176 configured for the activity. The VM manager 160 can retrieve the VM image 176 using any appropriate technique, such as using file system or block transfer operations.

In stage (F), the interaction engine 120 can accept from the client device 195, a request to access the next activity in the curriculum. In stage (G), the interaction manager 120 can provide to the curriculum management engine 115 an indication that the activity was requested, and in stage (H), the curriculum management engine 115 can provide to the activity management engine 130 an indication that the client device 195 is ready to begin or continue the activity, and therefore that the VM should be assigned to the client device 195.

In stage (I), the activity management engine 130 can instruct the VM manager 160 to assign the VM instance 175 to the client device 195. In some implementations, the activity management engine 130 can pass an activity assignment indicator to the VM manager 160. The activity assignment indicator can include an identifier for the client device 195 that requested the activity. The activity assignment indicator can also include an identifier for the activity requested.

In response, in stage (J), the agent 170 can provide a reference to the VM instance 175 to the activity management engine 130. In stage (K), the activity management engine 130 can provide the VM instance reference to the interaction engine 120, which can provide (in stage (L)) the VM instance reference to the client device 195.

In stage (M), the client device can create a peer-to-peer (P2P) session for the client device 195, and the client device 195 can then interact (stage N) with the activity loaded in the VM instance 175 through the P2P session. The P2P session 165 can be any session capable of exchanging data between a client device 195 and the VM instance 175. For example, a session 165 can be implemented using a TCP/IP socket or an HTTP session. In some implementations, the agent 170 can create the P2P session with the client device 195, instead of, or in addition to, providing a VM reference to the activity management engine 130.

The P2P session 165 can be configured such that a limited number of client devices 195, which can be only a single client device 195, can provide input over the input channel of the P2P session. When the P2P session 165 is established, the activity system 150 can provide an input channel token to client devices 195 that are permitted to provide input. When client devices 195 provide input, the client devices 195 can provide the input channel token with the input. If the activity system 150 receives input that does not include a valid input channel token, the activity system 150 can disregard the input.

In some implementations, an agent 170 executing on the activity system 150 can create a security key to secure the P2P session 165 between the client device 195 and the VM instance 175. The security key can be a 256-bit Advanced Encryption Standard (AES) key, Rivest Cipher 5 (RC-5), a Data Encryption Standard (DES) key, or another appropriate key type.

In some implementations, as the client device 195 is interacting with the activity, the VM manager 160 can monitor resources used by the VM instance 175. Monitored resources can include, without limitation, processors (CPUs, GPUs, etc.), storage, memory and network. If the VM manager 160 determines that the resource use of the VM instance 175 satisfies a threshold, which can be a threshold configured by a systems administrator, the VM manager 160 can alter the behavior of the virtual machine instance 175. Such behavior alterations can include suspending the VM instance 175 for a period of time or terminating the VM instance 175. As one example, if the VM manager 160 determine that a VM instance has used over a configured amount of CPU time over a given period (e.g., 30 seconds, 1 minute, 2 minutes, etc.), the VM manager 160 can suspend the VM instance 175 for a period (e.g., 1 minute, 2 minutes, etc.). The VM manager 160 can provide an indication to various parties that the behavior has been altered, and why. Such parties can include the client device 195, systems administrators, the owner and/or author of the curriculum and/or activity that exceeded the resource threshold, and so on.

Figure 2:
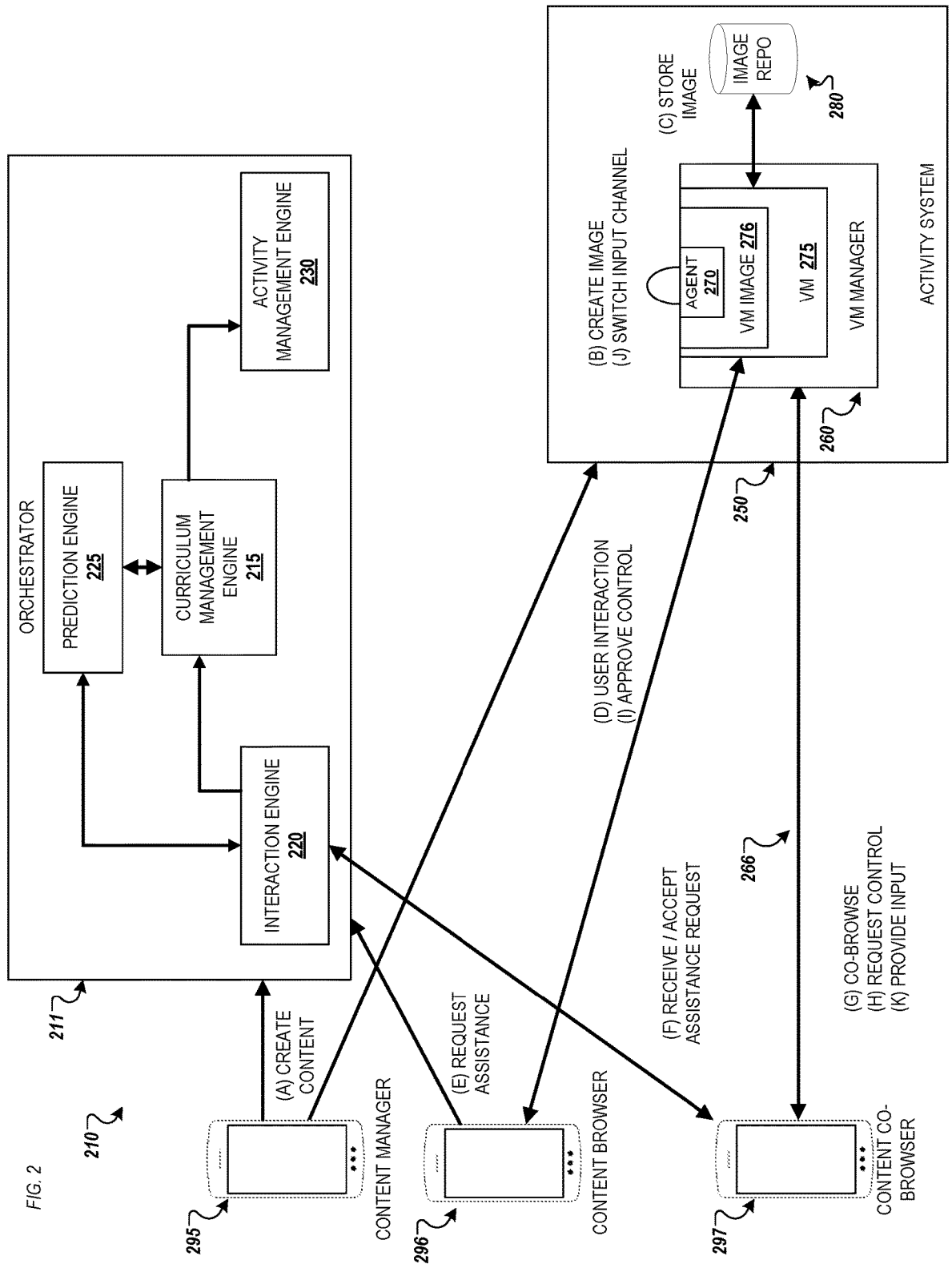

FIG. 2 shows a second example of an environment 210 for a virtualization-based collaborative activity framework. In some cases, an information consumer, such as a student, can benefit from collaboration on an activity with another party, including a peer with whom the student can discuss the material or an instructor who can provide guidance with the material or grade an assignment. In such cases, it is beneficial to provide an environment 210 that supports collaborative access to the content, including providing the ability to change which party controls the input channel to the content.

The environment 210 can include a collaboration orchestration system 211, an activity system 250 and client devices 295, 296, 297. The collaboration orchestration system 211 can be the collaborative orchestration system 111 of FIG. 1B, the activity system 250 can be the activity system 150 of FIG. 1B, and client devices 295, 296, 297 can be instances of client device 195 of FIG. 1B.

In stage (A), a client device 295 that is designated as the content manager can create content, such as an entire curriculum or activities within a curriculum. The content manager can provide activities to the activity system 250 and curricula to the orchestrator 211. The client device 295 can provide the content using any appropriate technique, such as transmitting the content over TCP/IP or HTTP or placing the content on a storage system, and providing the activity system 250 and/or the orchestrator 211 with a link to the content.

In stage (B), the activity system 250 can create a VM image, which can be VM image 176 of FIG. 1B, configured to store the activity, and when the image is executed, provide the activity to a client device 296. The activity system 250 can package the elements of the VM image in an appropriate VM image format that depends on the activity system 250. For example, if the activity system 250 provides a Linux environment and a Kernel-based Virtual Machine (KVM) hypervisor, the image format can be constructed for KVM. In stage (C), the activity system 250 can store the VM image in the image repository 280 (which can be the image repository 180 of FIG. 1B) using any appropriate data storage technique. For example, activity system 250 can use file system operations to store the VM image in an image repository 280 that includes a file system.

In stage (D), a content browser 296, which can be a client device 195 of FIG. 1B, can interact with an activity in a VM instance 275, which can be the VM instance 175 of FIG. 1B, that has been loaded as described in reference to FIG. 1B. The interaction can include viewing the content and providing input that represents an interaction with the content. For example, the content can be an education lesson, and the interaction can include viewing the lesson and performing exercises that are included in the lesson.

In stage (E), the content browser 296 sends a request for assistance to the orchestrator 211 using any appropriate technique. For example, the content browser can send a message using TCP/IP. In some implementations, the content browser 296 can send the request for assistance to the activity system 250 instead of, or in addition to, sending it to the orchestrator 211. In stage (F), the orchestrator 211 can send a message, e.g., over TCP/IP, to a content co-browser 297, which can be a client device 195 of FIG. 1B, inquiring as to whether the content co-browser 297 will provide assistance. In some implementations, the request can signify that the content browser 296 is requesting that a content co-browser 297 review progress in an activity or all activities in a curriculum. For example, the request can indicate that the content browser 296 is ready to have an activity graded and/or have other feedback provided.

The content co-browser 297 can transmit a message back to the orchestrator 211 indicating that it accepts or declines the request. If the request is accepted, in stage (G), the orchestrator 211 can instruct the activity system 250 to establish a P2P co-browsing session 266 between the content co-browser 297 and the VM image 275.

In stage (H), the co-browser 297 can request control of the content, and in stage (I), the content browser 296 can approve or decline the request. In some implementations, instead of, or in addition to, the co-browser 297 requesting control of the content, the content browser 296 can request that the co-browser 297 be granted access. In such cases, no further approval is needed.

In some implementations, in stage (J), if the request was approved by the content browser 296, in response to adding the co-browser 297 to the session, the activity system 250 can the switch input channels such that the co-browser 297 provides input to the activity system 250 in addition to, on instead of, the content browser 296 providing input. To switch the input channel from content browser 297 to content browser 296, the activity system 250 can invalidate the input channel token assigned to the content browser 296 and provide a valid input channel token to client browser 297. To enable content browser 296 to provide input in addition to content browser 297, the activity system can issue a value input channel token to content browser 296. In stage (K), the content co-browser 297 can provide input to the activity system 250.

Figure 3:
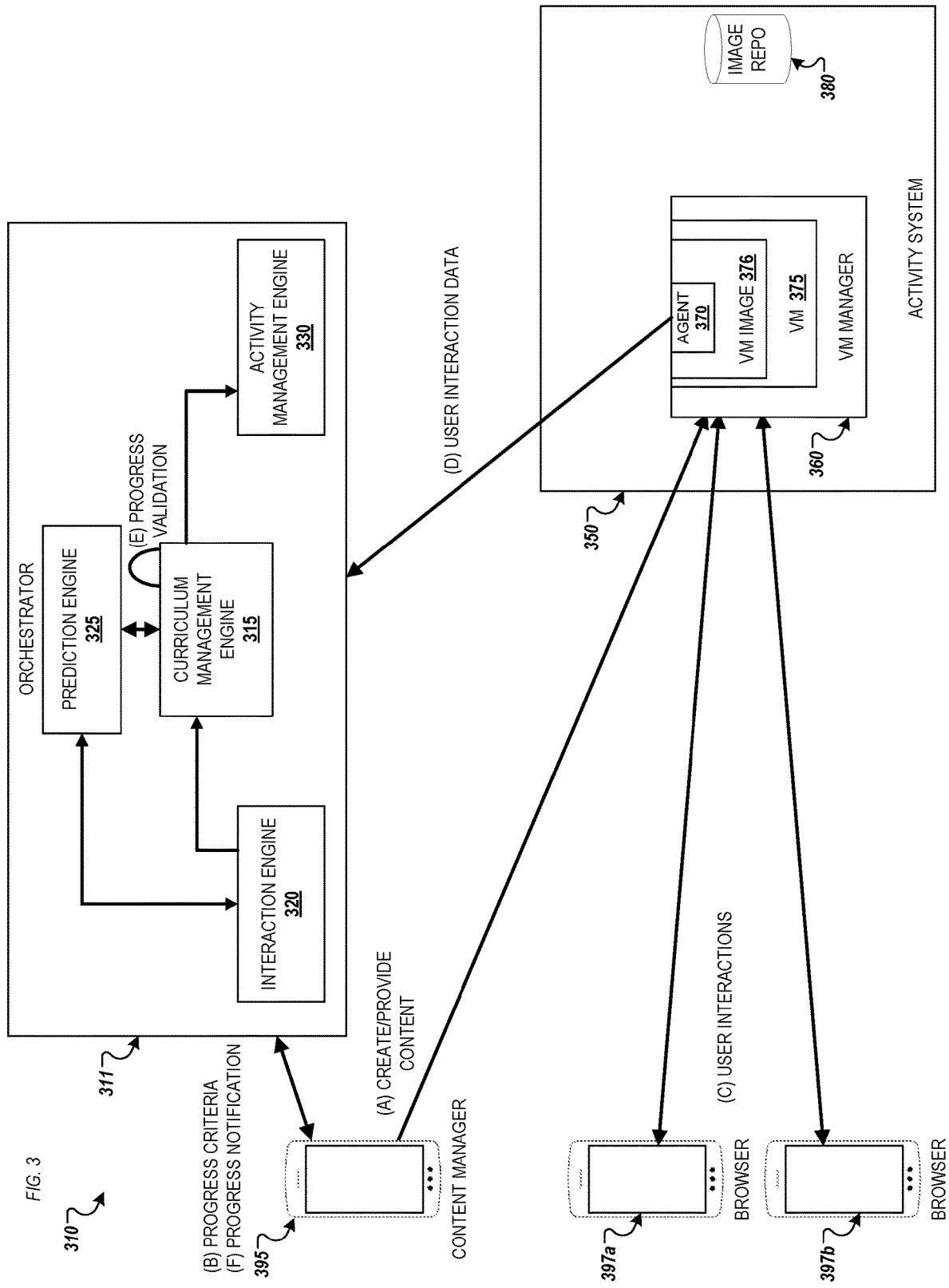

FIG. 3 shows a third example of an environment 310 for a virtualization-based collaborative activity framework. In some cases, it is useful to monitor the progress of information consumers, such as students, as they progress through the various activities in the curricula. In such cases, it can be beneficial to provide an environment 310 that provides progress reports, allowing content managers and other parties to take appropriate actions, such as providing assistance to students.

The environment 310 can include a collaboration orchestration system 311, an activity system 350 and client devices 395, 397a, 397b. The collaboration orchestration system 311 can be the collaborative orchestration system 111 of FIG. 1B, the activity system 350 can be the activity system 150 of FIG. 1B, and client devices 395, 397a and 397b can be examples of client device 195 of FIG. 1B.

In stage (A), a client device 395 that is a content manager can create content, such as an entire curriculum or activities within a curriculum, and provide the content to the orchestrator 311 and activity system 350. The content manager client device 395 can further monitor progress of other client devices 397a, 397b through the content, as described further below.

In stage (B), the client device 395 can provide to the orchestrator 311, progress criteria for the content. Progress criteria indicate whether a consumer of the content, such as a student, is progressing according to the expectations encoded in the criteria. Progress criteria can be expressed as rules that specify expected properties of interactions between client devices 397a, 397b (collectively referred to as client devices 397) and content. Criteria can relate to a single activity, a group of activities, an entire curriculum or a set of curricula, For example, a progress criterion can specify the number or percentage of questions that a user must answer correctly to show progress, a maximum time to progress through a particular subset of activities, a maximum number of requests for collaboration, and so on. Additionally, progress criteria can reflect results from multiple client devices 397. For example, a large number of client devices 397 all providing the same incorrect answer to a question in an activity can indicate an anomaly such as the question being poorly phrased, the reference answer being incorrect or atypical collaboration existing among the users of the client devices 397, In some implementations, the orchestrator 311 can include default progress criteria that are applied to content unless the client device 395, or another actor in the system, disable or overrides all or some of the default progress criteria. For example, a default criterion might specify that all activities and/or all activities in a curriculum should be completed within a specific period of time. In addition, the progress criteria can be included in content provided in stage (A) instead of, or in addition to, providing them in stage (B).

In stage (C), the activity system 350 can receive user interaction data that characterizes an interaction between the client device 397 and the activities. In addition, the orchestrator 311 can receive user interaction data that characterized interactions between the client devices 397 and activities in the curricula. In stage (D), the activity system 350 can provide the user interaction data to the interaction engine 315 in the orchestrator 311 indicating progress through the activity. As described above, user interaction data can include any data relevant to an interaction between a client device 397 and an activity.

In stage (E), the curriculum management engine 315 can perform progress validation against the progress criteria received by the curriculum management engine 315 in stage (B). The curriculum management engine 315 can evaluate the criteria against the user interaction data received in stages (C) and (D) to determine whether user progress satisfies the criteria. In some implementations, the criteria are expressed as rules which are evaluated using a rule-evaluation engine.

In stage (F), the curriculum management engine 315 can provide to the content manager 395 a progress notification indicating the results of evaluating the criteria. In some implementations, the curriculum management engine 315 can perform additional actions such as storing the progress notification on a storage system (e.g., a database) and/or providing the progress notification to other parties (e.g., client devices 397, parents or guardians of users of the client devices 397, accrediting agencies, and so on).

Figure 4:
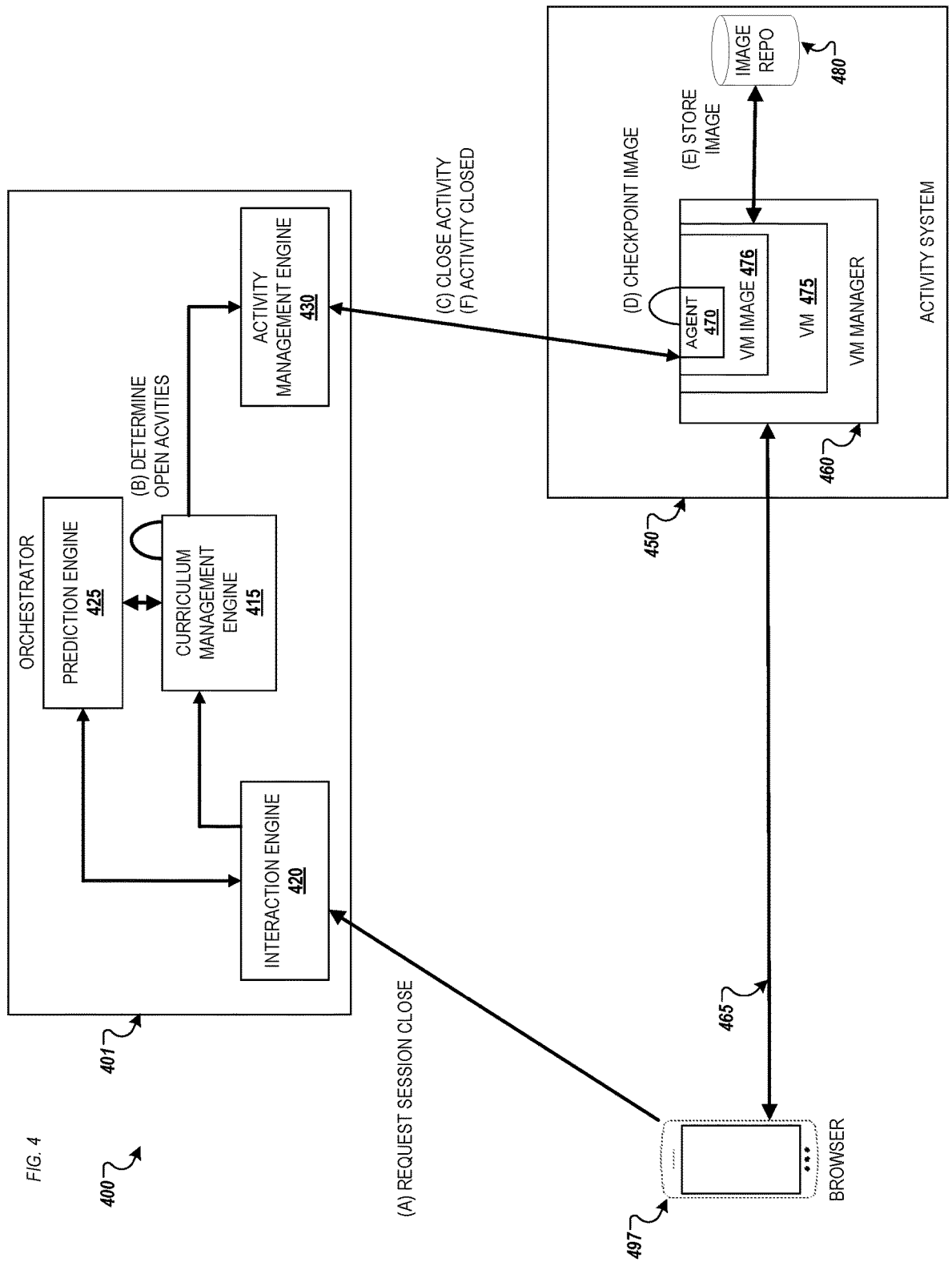

FIG. 4 shows a fourth example of an environment 410 for a virtualization-based collaborative activity framework. In this example, a user on a client device wishes to close an interaction session with the activities in a curriculum.

The environment 410 can include a collaboration orchestration system 411, an activity system 450 and a client device 497. The collaboration orchestration system 411 can be the collaborative orchestration system 111 of FIG. 1B, the activity system 450 can be the activity system 150 of FIG. 1B, and the client device 497 can be client device 195 of FIG. 1B.

In stage (A), the client device 497 can send a message to the orchestrator 411 indicating that the session with the activities for the curriculum should be terminated. In stage (B), curriculum management agent 415 in the orchestrator 411 can determine which activities are open. In some implementations, the orchestrator can maintain a list of activities requested by a client device 495 (e.g., in stage F of FIG. 1B) and that have not been completed or closed by the client device 495. In stage (C), the orchestrator 411 can send a message to the activity system 450 indicating that an activity should be closed.

In stage (D), the agent 470 in the activity system 450 creates a checkpoint image of the VM image 476. The checkpoint image can contain all state information necessary to restart the activities in the curriculum running in the VM image 476 from the checkpoint. The agent 470 can use any appropriate mechanism for creating the checkpoint image. For example, the agent 470 can checkpoint the VM image 476 itself, creating a copy of the contents of all memory used by the VM image 476 in the checkpoint image. When a session 465 with the activity restarts, the activity system 450 can load the checkpoint image, and the session 465 can resume from the point at which the session 465 closed. In another example, the agent 470 can store in the checkpoint image the state information relevant to the activities within the curriculum, such as progress through each activity, and information supplied by the client device 497. When the session 465 restarts, the agent 470 can read the checkpoint image, and load the saved state information into the activities, allowing the activities to resume from the point at which the session 405 closed.

Once the checkpoint has been created, in stage (E), the activity system 450 can store the contents of the checkpoint image to the image repository 480. In stage (F), the activity system 450 can send a message to the activity management system 430 indicating that the activity has been closed.

In some implementations, sessions can be terminated in response to a lack of activity. The agent 470 can be configured with an inactivity threshold (e.g., 10 minutes, 30 minutes, 1 hour, etc.), and when the inactivity threshold is satisfied, the agent 470 can checkpoint the image and terminate the session 465. The agent 470 can monitor the arrival time of user interaction data, and if no user interaction data is received within a configured threshold, the agent 470 can checkpoint the VM image 476 and terminate the session 465, as described above. When a session 465 is terminated, the activity system 450 can send a message to the activity management system 430 indicating that the activity has been closed.

In some implementations, the agent 470 provides a warning message to the client device 497 indicating that a session will be terminated if activity is not detected. The agent 470 can include a configured warning threshold, and when the warning threshold is satisfied, the agent 470 can transmit a message over the session 465 to the client device 497. The message can cause the client device 497 to display an inactivity warning, allowing the user of the client device 497 to determine whether to continue the session.

Figure 5:
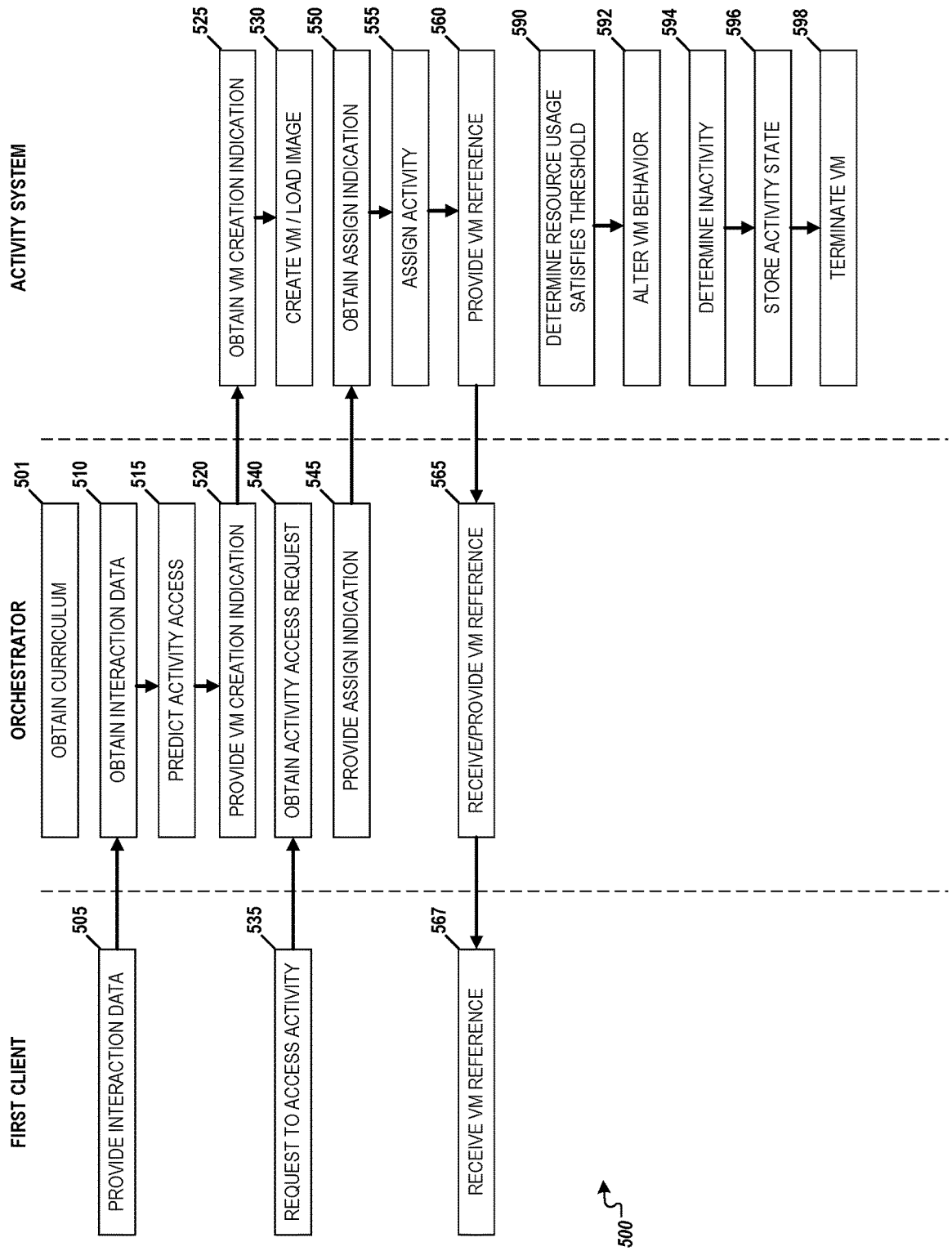
FIGS. 5-7 are flow diagrams of example processes for virtualization-based collaborative activities with predictive preloading of virtual machines.

FIG. 5 is a flow diagram of an example process 500 for virtualization-based collaborative activities with predictive preloading of virtual machines. For convenience, the process 500 will be described as being performed by a system for virtualization-based collaborative activities with predictive preloading of virtual machines, e.g., the orchestrator 111, activity system 150 and client device 195 of FIG. 1B, appropriately programmed to perform the process. Operations of the process 500 can also be implemented as instructions stored on one or more computer readable media which may be non-transitory, and execution of the instructions by one or more data processing apparatus can cause the one or more data processing apparatus to perform the operations of the process 500. One or more other components described herein can perform the operations of the process 500.

The orchestrator obtains (501) a curriculum using any appropriate technique. For example, the orchestrator can include an API that is configured to accept curricula, and by calling the API, a client device can provide a curriculum. In another example, the orchestrator can read a curriculum from a storage system, e.g., using appropriate SQL calls to retrieve a curriculum from a database or by using file system operations to read the curriculum from a file system.

A client device associated with a user, such as a student, provides (505) user interaction data, and the orchestrator obtains (510) the user interaction data, where user interaction data describes interaction with a first client device; The orchestrator can accept user interaction data from the client device using any appropriate technique. For example, the orchestrator can include an API configured to accept user interaction data from client devices. In another example, the interaction engine can accept user interaction data using a networking protocol such as Transport Control Protocol/Internet Protocol (TCP/IP) or Hypertext Transport Protocol (HTTP). The client device can provide the user interaction data by calling the API or by providing the user interaction data using the networking protocol.

The orchestrator uses the user interaction data to predict (515) activity access before receiving a request to access the activity. The orchestrator can use any appropriate technique for predicting whether the client device will access an activity in a curriculum. In some implementations, the orchestrator can include a set of criteria, where each criterion includes conditions and predictions. When the orchestrator determines that a condition is satisfied, it generates the associated prediction. Conditions can evaluate any information available to the orchestrator and all user interaction data. For example, a condition can state that if a user previously terminated a session before completing all required activities in a particular curriculum, and the user interaction data indicates that a user is logging in, the orchestrator can determine that the user will interact with that incomplete curriculum. In this example, the condition can state that if the user is logging in (according to the user interaction data), and the user has an incomplete curriculum, the condition is satisfied, and the associated prediction (that the user will interact with activities in the incomplete curriculum) should be provided.

In some implementations, the orchestrator can include a machine learning model, such as a deep neural network, that is configured to accept an input and to process the input to produce an output that includes a prediction of access to one or more of a plurality of activities. The input can include user interaction data and other state data of the orchestrator and/or of the activity system 150. Such state data can include, for example, which activities in which curricula were access by which users, which users have which incomplete activities in curricula, whether a curriculum was recently assigned, whether a curriculum has an approaching due date, prior interactions by a client device (e.g., a client device has accessed activities in a curriculum at a particular time on prior days), and so on. The machine learning model can be trained using examples that include user interaction data, state data and a result that indicates whether a client device interacted with activities in a curriculum, and if so, which curriculum included the activities with which the user interacted.

The orchestrator provides (520) a VM creation indication and the activity system obtains (525) the VM creation indication. The orchestrator can provide the VM creation indication to the activity system using any appropriate technique. For example, the activity system can include an API configured to accept VM creation indicators, and the orchestrator can call the API to provide the VM creation indicator. The VM creation indicator can include an activity identifier, which can be a unique set of characters. The activity indicator specifies to the activity system which VM image to load (i.e., the VM image that holds the activity), as described below. Thus, the collaboration orchestration system provides to the activity system an indication to load the virtual machine instance with the particular activity.

The activity system creates a VM instance and loads a VM image (530). The activity system can use any appropriate technique for creating a VM image. For example, the activity system can call an API that is configured to create a VM instance and that is provided by the operating system of the computer running the activity system. In another example, if the computer system includes a hypervisor, the activity system can call an API on a hypervisor that is configured to create a VM image.

The activity system can use the activity identifier to locate the image that contains the activity. For example, an image repository in the activity system can store VM images and can be configured to accept activity identifiers and to provide the VM image to which the activity identifier refers. A virtual machine manager in the activity system can retrieve the VM image using any appropriate technique, such as using file system or block transfer operations to retrieve the VM image from a storage system. The activity system can load the VM image into the VM instance. By loading the VM image when access to the activity is predicted, and before the user has actually accessed the activity, the orchestrator and the activity system enable a low-latency response once the user later accesses the activity.

The client device requests (535) access to an activity, and the orchestrator obtains (540) the activity request. In some implementations, the orchestrator can include an API configured to accept requests for activities, and the client device can call the API to request access to an activity. In some implementations, the orchestrator can provide a hyperlink, which, when activated by the client device (e.g., by clicking or tapping it), indicates to the orchestrator that the client device requests to access the activity.

The orchestrator provides (545) an activity assignment indicator, and the activity system obtains (550) the activity assignment indicator. The orchestrator can provide the activity assignment indicator using any appropriate technique, such as calling an API provided by the activity system or by passing a network message containing the activity assignment indicator. The activity indicator can include an identifier for the requesting client device and an indication of the activity to be assigned.

The activity system assigns (555) the activity to the client device indicated in the assignment indicator by providing to the activity the reference to the client device included in the activity assignment indicator, reserving the activity for the client device. The activity system further provides (560) to the orchestrator a reference to the VM hosting the activity, e.g., by passing the reference over network connection or by calling an API provided by the orchestrator. Regardless of the technique used, the orchestrator receives (565) the VM reference. The orchestrator can provide (567) the VM reference to the client device, e.g., by passing the reference over network connection or by calling an API provided by the client device. The client device is therefore connected to the activity.

The client device can then establish a P2P session to the activity. For example, the client device can establish a TCP/IP socket using the VM reference obtained in operation 567. Once the P2P session is established, the client can interact with the activity.

To ensure the integrity of the P2P session, in some implementations, the activity system can create a security key and provide the security key to the client device. As noted above the security key can be any appropriate type of security key, such as an AES key or a Rivest Cipher 5 key. The activity system can provide the key to the client device over a secure channel such as HTTP-Secure (HTTP-S). Further interactions between the client device and the activity system can be encrypted using the key.

In some implementations, to ensure that the resources of the computing system hosting the activity system are shared equitably, the activity system can monitor resource usage by the VM instance hosting the activity, and alter the behavior of VM instances that are consuming an excess amount of resource. The system can monitor the resource using any appropriate technique. For example, the activity system can call APIs provided by the computing system that are configured to provide resource use. As noted above, monitored resources can include processors, storage, memory and network.

The activity system can determine (590) whether the resource usage satisfies a configured threshold. The threshold can be provided by a systems administrator, and can be static or dynamic. A static threshold can indicate a level that cannot be exceeded; a dynamic threshold can depend on the overall system demand. For example, if the overall system demand is low, a dynamic threshold for any VM instance can be higher, while when demand is high, the dynamic threshold for any VM instance can be lower, reflecting the increased contention for resources. The activity system can include thresholds for individual resources, aggregate thresholds, or any combination. An aggregate threshold can involve multiple resources, e.g., a level of processor use and a level of memory (e.g., Random Access Memory (RAM)). In response to determining that the resource usage of the virtual machine instance satisfies a threshold, the activity system can alter (592) the behavior of the VM image running in the VM instance. For example, the activity system can suspend operation of the virtual machine instance for a configured period of time or terminate the virtual machine instance.

Similarly, the activity system can determine (594) that an inactivity threshold has been satisfied, and therefore, the activity is inactive. For example, if no user interaction data has been received over a configured period of time (e.g., 2 minutes, 5 minutes, 10 minutes, etc.) the activity system can determine that the activity is inactive. In response, the activity system can store (596) the activity state. Storing the activity state can include checkpointing the VM image and writing the checkpoint to a storage system, or using any other appropriate technique. The activity system can also terminate (598), the VM instance using any appropriate technique. For example, the activity system can call an API provided by the operating system or by a hypervisor that is configured to terminate the VM instance hosting the activity.

Figure 6:
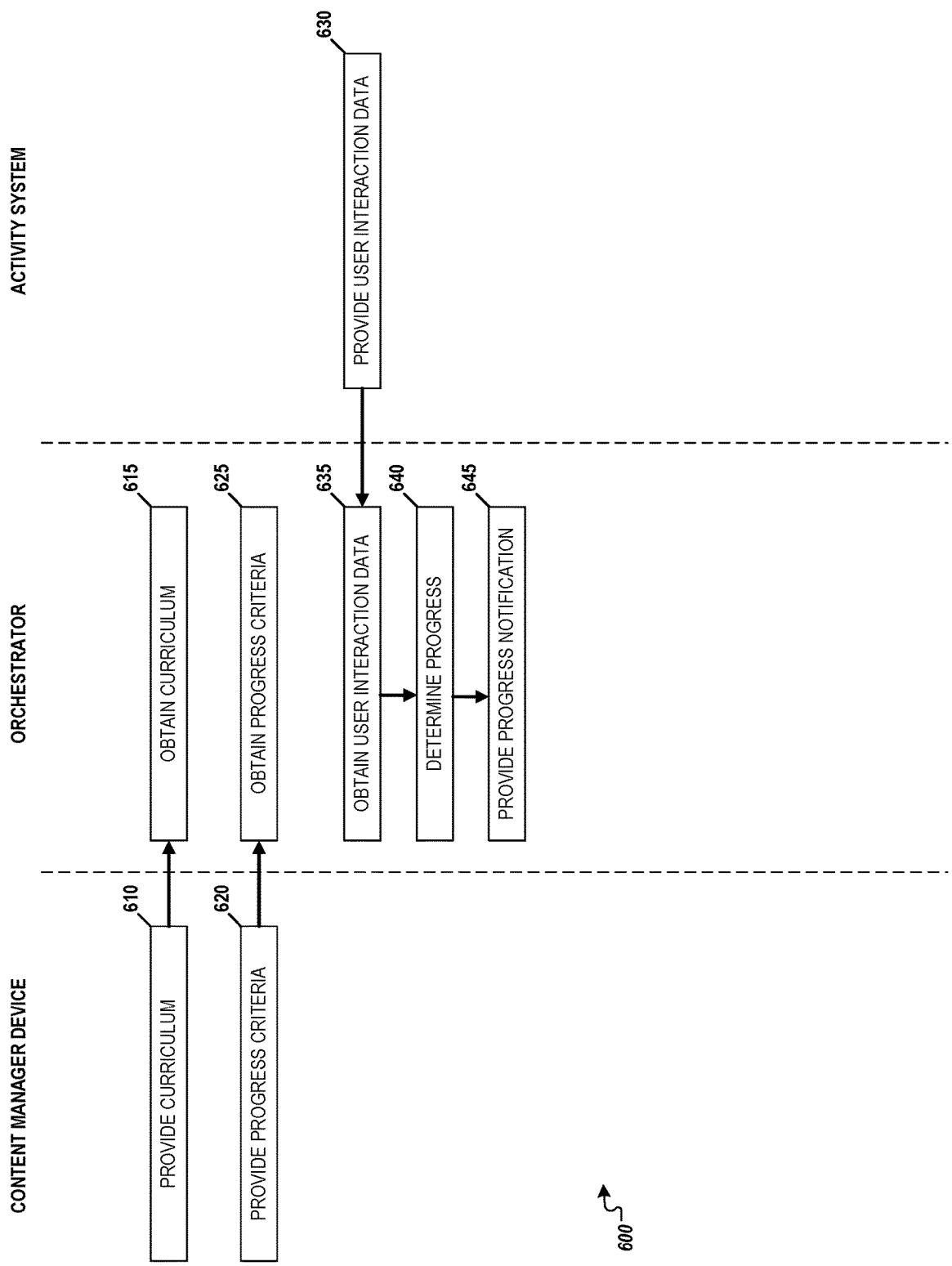

FIG. 6 is a flow diagram of an example process 600 for virtualization-based collaborative activities with predictive preloading of virtual machines. Specifically, the process 600 provides progress indicators based on a user's interaction with activities in the curriculum. Monitoring progress can assist students by providing recommendations that assistance be provided, and indications that activities in a curriculum might be confusion or contain errors.

For convenience, the process 600 will be described as being performed by a system for virtualization-based collaborative activities with predictive preloading of virtual machines, e.g., the orchestrator 111, activity system 160 and client device 196 of FIG. 1B, appropriately programmed to perform the process. Operations of the process 600 can also be implemented as instructions stored on one or more computer readable media which may be non-transitory, and execution of the instructions by one or more data processing apparatus can cause the one or more data processing apparatus to perform the operations of the process 600. One or more other components described herein can perform the operations of the process 600.

The content manager device can provide (610) the curriculum using any appropriate technique, such as transmitting the content over TCP/IP or HTTP or placing the content on a storage system, and providing the orchestrator with a link to the curriculum. The orchestrator can obtain (615) the curriculum using corresponding operations, for example, by reading it from a storage system.

The content manager can further provide (620) progress criteria that indicate whether consumers of content, such as a student or group of students, is progressing according to the expectations encoded in the criteria. As described above, progress criteria can be expressed as rules that specify, for an activity, group of activities, an entire curriculum or a set of curricula, expected properties of interactions between client devices and the content. The content manager can provide the progress criteria and the orchestrator can obtain (615) the criteria using any appropriate technique. For example, the content manager can call an API provided by the orchestrator, and the API can be configured to accept progress criteria. In some implementations, progress criteria that relate to a single curriculum or one or more activities within a curriculum can be included in the curriculum.

The activity system can receive user interaction data from a client device, e.g., a client device used by a student, interacting with one or more activities included in a curriculum. For example, the user interaction data can be received over a P2P session between the client device and the activity system. The activity system can provide (630) the user interaction data to the orchestrator, which thus obtains (635) the user activity data. The activity system can transfer the user interaction data to the orchestrator using any appropriate technique, such as transmitting the data over a network connection (e.g., a TCP/IP socket) or by calling an API on the orchestrator that is configured to accept user interaction data. The user interaction data can serve as a progress indicator that specifies the progress of the first client device through the activity.

The orchestrator determines (640) progress by evaluating the criteria. The orchestrator can evaluate the criteria by executing the rules provided by the content manager device using at least the user interaction data. Each rule can include a set of conditions and a result such that when a condition is satisfied, the result is produced and can be included in a progress notification. The conditions can be any Boolean expression that is expressed in terms of user interaction data and/or other properties of the system (e.g., time of day, time since last interaction, etc.). For example, a condition can specify that if an activity is completed, the condition is satisfied, and a progress indicator can be produced indicating that the activity has been completed, as described further below. The orchestrator can evaluate the criteria at various times, such as when user input data arrives or periodically (e.g., every minute, 2 minutes, 5 minutes, etc.).

When the progress indicator satisfies the criteria, the orchestrator can provide (645) a progress notification. The progress notification can be included in the rule, as described above. The orchestrator can provide progress notifications to the content manager device, to the device associated with the student performing the activity, to other parties (e.g., parents or guardians) registered with the orchestrator, and so on. In some implementations, the progress notification can include a recommendation that the user request assistance, or a request for assistance, as described further in reference for FIG. 7.

Figure 7:
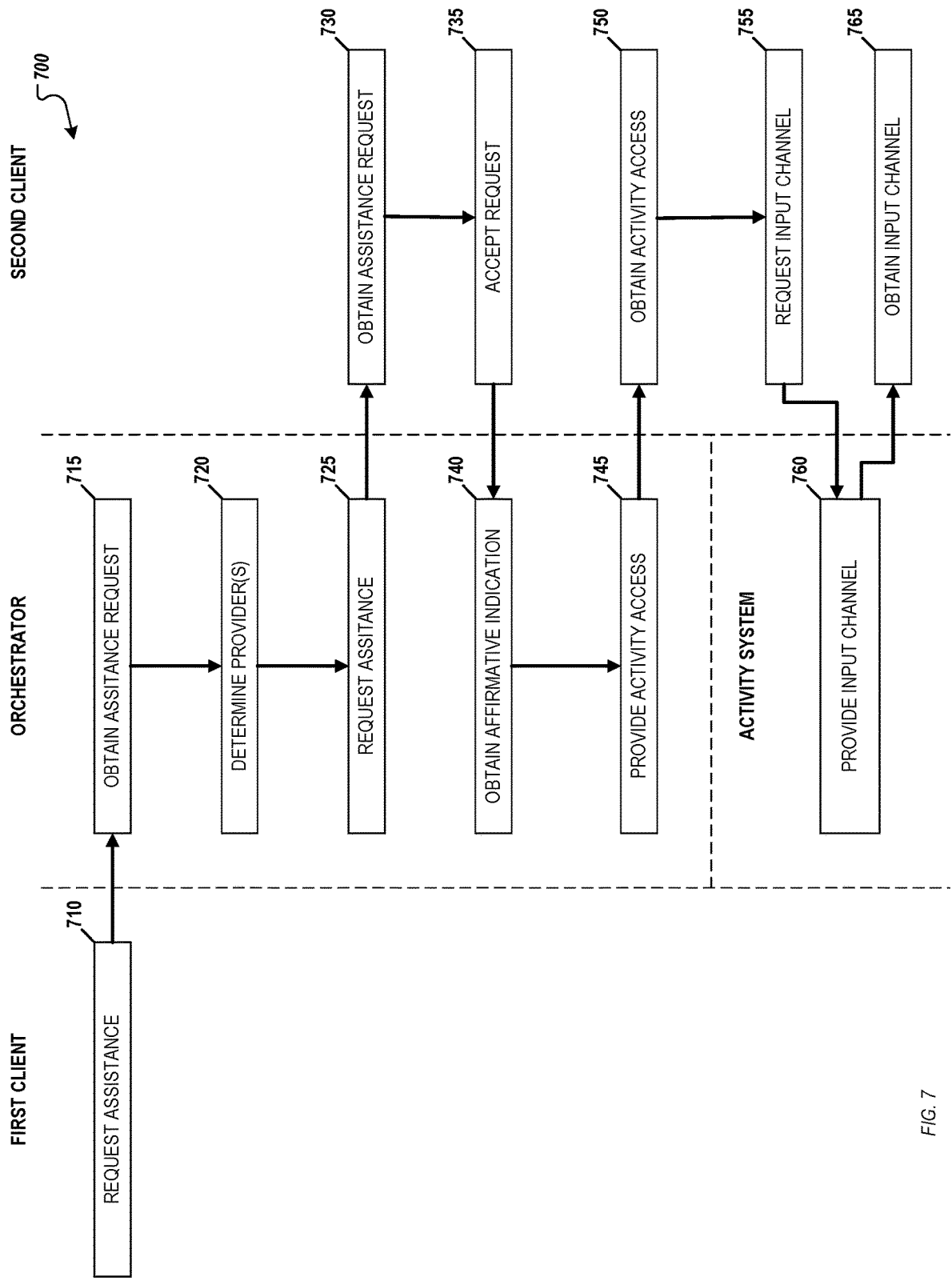

FIG. 7 is a flow diagram of an example process 700 for virtualization-based collaborative activities with predictive preloading of virtual machines. When interacting with activities, some users might comprehend the material more easily than other users, and it is beneficial to allow users that are having difficulty with material to request assistance from peers, instructors, tutors, and other parties qualified to assist. In addition, when a student completes an assignment, or wishes to have progress checked, it is beneficial to allow that user to hand-off control of a session to another user. The process 700 provides those benefits.

For convenience, the process 700 will be described as being performed by a system for virtualization-based collaborative activities with predictive preloading of virtual machines, e.g., the orchestrator 111, client devices 195 of FIG. 1B, appropriately programmed to perform the process. Operations of the process 700 can also be implemented as instructions stored on one or more computer readable media which may be non-transitory, and execution of the instructions by one or more data processing apparatus can cause the one or more data processing apparatus to perform the operations of the process 700. One or more other components described herein can perform the operations of the process 700.

A first client device that is providing access for a user (e.g., a student) to one or more activities can send a request (710) for assistance for the activity or activities, and the orchestrator can obtain (715) the request. The request can be sent and received using any appropriate technique. For example, the orchestrator can include an API configured to accept requests for assistance, and the first client device can request assistance by calling the API. In another example, the request for assistance is transmitted over a network, such as a TCP/IP network. In some implementations, the first client device can provide the request to an activity system (e.g., the activity system 150 of FIG. 1B), and the activity system can provide the request to the orchestrator. In some implementations, the request can specify one or more preferred providers of assistance, e.g., by specifying a username, email address or other identifying characteristic.

The orchestrator can determine (720) one or more potential providers of assistance at second client devices. In some implementations, users who are willing to provide assistance can register with the orchestrator (e.g., by sending a registration message or by calling an API provided by the orchestrator configured to accept registrations), and the orchestrator can store the list of such registered users. The registration can further include a list of activities, curricula, or topic categories for which the user is registering. The orchestrator can determine which registered users are appropriate for providing assistance. In various implementations, the orchestrator can select all users specified in the assistance request, a subset of users specified in the assistance request, registered users, a specified number of registered users (e.g., 2, 5 or 10), all registered users who have indicated interest in the activity, curriculum or topic, a specified number of registered users who have indicated interest in the activity, curriculum or topic, a single user who has indicated interest, and if that user does not accept (operation 735), the orchestrator can select a different user.

The orchestrator can request assistance (725) from one or more other second client devices that are not the first client device. The orchestrator can transmit messages (e.g., over TCP/IP) to the second devices determined in operation 720. A second client device can obtain (730) the assistance request (e.g., by receiving the TCP/IP message) and accept (735) the assistance request by sending an affirmative indication of assistance, e.g., by sending a message over TCP/IP or by calling an API provided by the orchestrator that is configured to receive indications that requests for help have been accepted. The orchestrator can obtain (740) the affirmative indication of assistance using the technique of the second client device.

The orchestrator can provide (745) access to the activity, and the second client device can obtain (750) activity access. As described in reference to FIG. 1B, the first client device and the activity can be connected by a P2P session and an input channel token can be used to permit the first client device to provide input. In some implementations, the orchestrator can obtain the input channel token from the activity system, and can provide to the second client device access to the input channel by providing the input channel token.

In some implementations, the second client device can request (755) an input channel. The second client device can provide the request by sending a message to the activity system (e.g., over TCP/IP) or by calling an API on the activity system that is configured to access requests for input channels.

The activity system (which can be the activity system 150 of FIG. 1B) can provide (760) the input channel and the second client device can obtain (765) the input channel. As described above, the activity system can provide an input channel token to the second device that enables the second device to provide input. The activity system can provide the input channel token using any appropriate technique, such as providing it over a network connection or by calling an API on the second client device that is configured to accept input channel tokens. Having obtained the input channel, the second client device can provide input to the activity.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, special purpose microprocessors. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

To provide for interaction with a user, embodiments of the subject matter described in this specification can be implemented on a computing device capable of providing information to a user. The information can be provided to a user in any form of sensory format, including visual, auditory, tactile or a combination thereof. The computing device can be coupled to a display device, e.g., an LCD (liquid crystal display) display device, an OLED (organic light emitting diode) display device, another monitor, a head mounted display device, and the like, for displaying information to the user. The computing device can be coupled to an input device. The input device can include a touch screen, keyboard and a pointing device, e.g., a mouse or a trackball, by which the user can provide input to the computing device. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and P2P networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Thus, unless explicitly stated otherwise, or unless the knowledge of one of ordinary skill in the art clearly indicates otherwise, any of the features of the embodiments described above can be combined with any of the other features of the embodiments described above.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

The invention claimed is:

1. A computer-implemented method comprising:
   obtaining, by a collaboration orchestrator of an electronic learning system, user interaction data that describe interactions with a first client device of a student that is associated with the electronic learning system;
   determining, by the collaboration orchestrator of the electronic learning system, that the user interaction data reflects that the student has reached a point in an educational curriculum that occurs before a particular, resource-intensive learning activity;
   before receiving a request from the first client device to initiate the particular, resource-intensive learning activity and in response to determining that the user interaction data reflects that the student has reached the point in the educational curriculum that occurs before the particular, resource-intensive learning activity:
   selecting, by the collaboration orchestrator of the electronic learning system, a virtual machine image that is associated with the particular, resource-intensive learning activity, from among multiple virtual machine images that are associated with different, resource-intensive learning activities in an image repository of an activity server of the electronic learning system, providing, by the collaboration orchestrator of the electronic learning system, an indication to the activity server of the electronic learning system to create a virtual machine instance at the activity server, providing, by the collaboration orchestrator of the electronic learning system, an indication to the activity server of the electronic learning system to load the virtual machine image that is associated with the particular, resource-intensive learning activity, in the virtual machine instance, and receiving, by the collaboration orchestrator of the electronic learning system, a reference to the virtual machine instance from the activity server of the electronic learning system;

after the reference to the virtual machine instance has been received and in response to obtaining, by the collaboration orchestration system, a request to access the particular learning activity that is provided by the virtual machine instance from the first client device of the student that is associated with the electronic learning system, providing, to the first client device of the student, the reference to the virtual machine instance for use by the first client device in creating a peer-to-peer connection between the first client device and the activity server of the electronic learning system;

obtaining, from the activity server and by the collaboration orchestrator, a progress indicator that specifies progress of the first client device of the student as the student progresses through the particular, resource-intensive learning activity provided by the activity server; and in response determining, by the collaboration orchestrator, that the progress indicator satisfies criteria, providing a progress notification from the electronic learning system to the first client device of the student.

2. The computer-implemented method of claim 1, wherein determining that the user interaction data reflects that the student has reached the point in the educational curriculum that occurs before the particular, resource-intensive learning activity:

processing, by the collaboration orchestrator, an input that includes the user interaction data using a model that is configured to predict an impending need to access to one of the different, resource-intensive learning activities.

3. The computer-implemented method of claim 1, further comprising:

obtaining, by the collaboration orchestrator and from the first client device, a first request for assistance in connection with the particular, resource-intensive learning activity provided by the activity server;

obtaining, by the collaboration orchestrator and from a second client device of a teacher that is not the first client device, an affirmative indication of availability to provide assistance by a teacher; and providing, by the collaboration orchestrator and to the second client device of the teacher, access to the particular, resource-intensive learning activity.

4. A computer-implemented method comprising:

in response to a determination at an electronic learning system that user interaction data obtained by the electronic learning system reflects that a student has reached a point in an educational curriculum that occurs before a particular, resource-intensive learning activity, and before the electronic learning system has received a request from a first client device of the student to initiate the particular, resource-intensive activity:

receiving, by an activity system and from the electronic learning system, an indication of create a virtual machine instance and, in response, creating, by the activity system, the virtual machine instance;

receiving, by the activity system and from the electronic learning system, an indication to load a virtual machine image that is associated with the particular, resource-intensive learning activity, in the virtual machine instance and, in response, loading, by the activity system, the virtual machine image associated with the particular, resource-intensive learning activity, in the virtual machine instance;

providing, by the activity system, a reference to the virtual machine instance to the electronic learning system;

using, by the activity system, the reference to create a peer-to-peer connection between the activity system and the first client device;

obtaining, by the activity system, a progress indicator that specifies progress of the first client device of the student as the student progresses through the particular, resource-intensive learning activity provided by the activity server; and providing a progress notification to the first client device of the student.

5. The computer-implemented method of claim 4, wherein the virtual machine image includes an agent that is specific to the particular, resource-intensive learning activity.

6. The computer-implemented method of claim 4, further comprising:

providing, by the activity system and to a second client device, an input channel.

7. The computer-implemented method of claim 4, further comprising:

in response to determining, by the activity system, that an inactivity threshold for the particular activity has been satisfied:

storing, by the activity system, state information relating to the particular activity; and terminating, by the activity system, the virtual machine instance.

8. The computer-implemented method of claim 7, wherein storing the state information comprises checkpointing the Virtual Machine image.

9. The computer-implemented method of claim 4, further comprising:

in response to determining, by the activity system, that resource usage of the virtual machine instance satisfies a threshold, altering behavior of the virtual machine image.

10. The computer-implemented method of claim 9, wherein the altering is at least one of suspending the virtual machine instance or terminating the virtual machine instance.

11. The computer-implemented method of claim 4, wherein providing the reference to the virtual machine instance further comprises:

creating, by the activity system, a security key; and providing, by the activity system and to the first client device, the security key.

12. The computer-implemented method of claim 11, wherein the security key is a 256-bit Advanced Encryption Standard key, a Rivest Cipher 5, or a Data Encryption Standard key.

13. A system comprising one or more processors and one or more non-transitory storage devices storing instructions that when executed by the one or more processors cause the one or more processors to perform operations comprising:
   in response to a determination at an electronic learning system that user interaction data obtained by the electronic learning system reflects that a student has reached a point in an educational curriculum that occurs before a particular, resource-intensive learning activity, and before the electronic learning system has received a request from a first client device of the student to initiate the particular, resource-intensive activity:
      receiving, by an activity system and from the electronic learning system, an indication of create a virtual machine instance and, in response, creating, by the activity system, the virtual machine instance;
      receiving, by the activity system and from the electronic learning system, an indication to load a virtual machine image that is associated with the particular, resource-intensive learning activity, in the virtual machine instance and, in response, loading, by the activity system, the virtual machine image associated with the particular, resource-intensive learning activity, in the virtual machine instance;
      providing, by the activity system, a reference to the virtual machine instance to the electronic learning system;
      using, by the activity system, the reference to create a peer-to-peer connection between the activity system and the first client device;
      obtaining, by the activity system, a progress indicator that specifies progress of the first client device of the student as the student progresses through the particular, resource-intensive learning activity provided by the activity server; and
      providing a progress notification to the first client device of the student.

14. The system of claim 13, wherein the virtual machine image includes an agent that is specific to the particular, resource-intensive learning activity.

15. The system of claim 13, the operations further comprising:
   providing, by the activity system and to a second client device, an input channel.

16. The system of claim 13, the operations further comprising:
   in response to determining, by the activity system, that an inactivity threshold for the particular activity has been satisfied:
      storing, by the activity system, state information relating to the particular activity; and
      terminating, by the activity system, the virtual machine instance.

17. The system of claim 16, wherein storing the state information comprises checkpointing the Virtual Machine image.

18. The system of claim 13, the operations further comprising:
   in response to determining, by the activity system, that resource usage of the virtual machine instance satisfies a threshold, altering behavior of the virtual machine image.

19. The system of claim 13, wherein providing the reference to the virtual machine instance further comprises:
   creating, by the activity system, a security key; and
   providing, by the activity system and to the first client device, the security key.

* * * * *